United States Patent
Gatzke

(10) Patent No.: US 8,342,443 B2
(45) Date of Patent: Jan. 1, 2013

(54) WING-ENGINE COMBINATION, AN AIRCRAFT, AND A WING SECTION OF AN AIRCRAFT COMPRISING AN ENGINE BLEED-AIR DUCT ARRANGEMENT

(75) Inventor: Sten Gatzke, Emtinghausen (DE)

(73) Assignee: Airbus Operations GmbH, Hamburg (DE)

( * ) Notice: Subject to any disclaimer, the term of this patent is extended or adjusted under 35 U.S.C. 154(b) by 234 days.

(21) Appl. No.: 12/863,495

(22) PCT Filed: Jan. 30, 2009

(86) PCT No.: PCT/EP2009/000620
§ 371 (c)(1),
(2), (4) Date: Aug. 2, 2010

(87) PCT Pub. No.: WO2009/095257
PCT Pub. Date: Aug. 6, 2009

(65) Prior Publication Data
US 2010/0288890 A1    Nov. 18, 2010

Related U.S. Application Data

(60) Provisional application No. 61/025,467, filed on Feb. 1, 2008.

(30) Foreign Application Priority Data

Feb. 1, 2008   (DE) .......................... 10 2008 007 278

(51) Int. Cl.
*B64D 15/02* (2006.01)
(52) U.S. Cl. .............. 244/53 R; 244/134 R; 244/134 B; 60/39.093; 60/785
(58) Field of Classification Search ................ 244/53 B, 244/53 R, 57, 134 B, 134 R; 60/39.093, 60/785
See application file for complete search history.

(56) References Cited

U.S. PATENT DOCUMENTS

| 2,501,633 A | 3/1950 | Prince |
| 6,442,944 B1 | 9/2002 | Skur, III |
| 6,629,428 B1 | 10/2003 | Murry |

FOREIGN PATENT DOCUMENTS

| DE | 2912241 A1 | 10/1980 |
| DE | 102008013013 A1 | 11/2008 |
| GB | 626571 A | 7/1949 |

OTHER PUBLICATIONS

International Preliminary Report on Patentability for corresponding PCT application PCT/EP2009/000620, dated Sep. 7, 2010.
International Search Report for corresponding PCT application PCT/EP2009/000620, dated Aug. 5, 2009.

*Primary Examiner* — Tien Dinh
*Assistant Examiner* — Nicholas McFall
(74) *Attorney, Agent, or Firm* — Matthew B. Dernier, Esq.; Gibson & Dernier LLP

(57) ABSTRACT

A wing-engine combination includes: a wing with a main wing and an engine with a premixing chamber, a combustion chamber and a hot-air space, which includes: an engine bleed-air duct, which extends along the wingspan direction and along the leading edge of the main wing, including an engine bleed-air inlet device that is coupled to an engine hot-air space, and including an engine bleed-air outlet device having a discharge orifice on the main wing or a connecting part for coupling the engine bleed-air duct to a consumer of the engine bleed-air, an ambient-air duct, which extends along the engine bleed-air duct, including an ambient-air inlet device which is arranged on an aircraft component of the aircraft, which aircraft component faces the intended flow-around direction of the aircraft and includes an aperture for letting ambient air into the ambient-air duct, and including an ambient-air outlet device with a passage between the ambient-air duct and a premixing chamber of the engine so that the arrangement including the engine bleed-air duct and the ambient-air duct forms a heat exchanger device for cooling the air flowing in the engine bleed-air duct and so that the ambient air conveyed in the ambient-air duct is supplied for combustion in the engine; and an aircraft and a wing section of an aircraft including an engine bleed-air duct arrangement.

18 Claims, 5 Drawing Sheets

WING-ENGINE COMBINATION, AN AIRCRAFT, AND A WING SECTION OF AN AIRCRAFT COMPRISING AN ENGINE BLEED-AIR DUCT ARRANGEMENT

CROSS REFERENCE TO RELATED APPLICATIONS

This application claims priority to PCT Application No. PCT/EP2009/000620, filed Jan. 30, 2009; which claims priority to German Patent Application No. DE 10 2008 007 278.8, filed Feb. 1, 2008, and claims the benefit to U.S. Provisional Patent Application No. 61/025,467, filed Feb. 1, 2008, the entire disclosures of which applications are hereby incorporated by reference.

BACKGROUND

The invention relates to a wing-engine combination comprising a wing and an engine, an aircraft with a wing, and a wing section of an aircraft comprising an engine bleed-air duct arrangement.

U.S. Pat. No. 6,629,428 B1 describes an aircraft environmental control system (ECS) which provides fresh air for the cabin of an aircraft by using electric motor driven compressors in place of traditional engine bleed air.

U.S. Pat. No. 2,501,633 and GB 626 571 disclose the use of a heat exchanger for a gas turbine power plant.

The use of engine bleed-air is well known in a host of different systems in an aircraft. Engine bleed-air is, among other things, used for thermal regulation and for providing pressure to the aircraft cell. Moreover, fuel tanks, hydraulic tanks and water tanks are kept pressurised with the use of bleed-air, for example in order to prevent any failure of pumps. Bleed-air removal is a simple and proven system that is designed with components that from a technical point of view are easy to implement.

The use of bleed-air is associated with a disadvantage because of the resulting increase in the fuel consumption and decrease in the engine output. For this reason bleed-air removal is switched off, for example, during high takeoff output so as to prevent the risk of turbine overheating. In some of the most modern aircraft in an attempt to reduce fuel consumption there is therefore no longer any bleed-air branched off from the engines. The air conditioning system and other auxiliary power units are in these cases operated entirely electrically. In order to generate the electrical power necessary for this the engines are equipped with more powerful generators to compensate for this.

From U.S. Pat. No. 6,442,944 a heat exchanger in an engine is known, by means of which heat exchanger hot bleed-air is cooled in that in a first step it is conveyed to the engine inlet region where it counteracts any icing that occurs in that region, and where it is at the same time cooled by the ambient-air flow. The cooled bleed-air can then be used in different systems in the aircraft.

SUMMARY OF THE INVENTION

It is the object of the invention to provide a wing-engine combination, an aircraft and a wing section of an aircraft with an engine bleed-air duct arrangement, by means of which it is possible to optimally use engine bleed-air for various purposes and/or for systems of the aircraft, and in particular for the air conditioning system of the aircraft.

This object is met by the characteristics of one or more embodiments disclosed and described herein. Further embodiments are also disclosed and described herein.

By means of a solution according to the invention, in particular in an engine, the loss of power resulting from bleed-air removal can at least in part be compensated for. Above all, by means of the invention an overall system of the aircraft is achieved that is optimal from the point of view of energy use, in particular with a reduction in the danger of overheating of a wing component as a result of conveying bleed-air from the engine through the respective wing section.

According to a further aspect of the invention, a wing-engine combination is provided comprising a wing with a main wing and an engine with a premixing chamber, a combustion chamber and a hot-air space, further comprising:

an engine bleed-air duct, which extends along the wing-span direction and in particular in sections along the leading edge of the main wing, comprising an engine bleed-air inlet device that is coupled to an engine hot-air space, and comprising an engine bleed-air outlet device comprising a discharge orifice on the main wing or a connecting part for coupling the engine bleed-air duct to a consumer of the engine bleed-air, an ambient-air duct, which extends along the engine bleed-air duct, comprising an ambient-air inlet device which is arranged on an aircraft component that faces the intended flow-around direction of the aircraft and comprises an aperture for letting ambient air into the ambient-air duct, and comprising an ambient-air outlet device with a passage between the ambient-air duct and a premixing chamber of the engine, so that the arrangement comprising the engine bleed-air duct and the ambient-air duct forms a heat exchanger device for cooling the air flowing in the engine bleed-air duct and so that the ambient air conveyed in the ambient-air duct is supplied for combustion in the engine.

In this arrangement the engine bleed-air duct and the ambient-air duct can be designed in such a manner that with the intended flow around the wing the engine bleed-air in the engine bleed-air duct flows from the engine to the engine bleed-air outlet device, and the ambient air in the ambient-air duct flows in a direction opposite to the direction of flow of the engine bleed-air.

The consumer of the engine bleed-air, to which consumer the engine bleed-air duct is coupled by means of the engine bleed-air outlet device, can, in particular, be an air conditioning system of the aircraft.

In the wing-engine combination according to the invention, the component of the aircraft on which the aperture of the ambient-air inlet device is provided can be arranged at a surface of the wing connection region that extends from the fuselage exterior in the direction of the engine mount spaced apart by 10% of the space between the fuselage exterior and the engine mount, or can be arranged at a surface of the belly fairing.

Generally speaking, the ambient-air duct can be designed in such a manner that it circumferentially encompasses the engine bleed-air duct in a helical manner at least in some sections.

Furthermore, it can be provided for the ambient-air duct to enclose the engine bleed-air duct fully in some sections or at least over a partial circumference.

With the embodiments according to the invention it can be provided for a device for influencing the flow in the ambient-air duct to be integrated in the ambient-air duct. The device for influencing the flow can, in particular, comprise a flow assist drive that for influencing the flow is integrated in the ambient-air duct that leads from the ambient-air inlet device to the ambient-air outlet device. As an alternative or in addition, the device for influencing the flow can comprise a movable aperture-changing device with a cover for opening and closing the aperture of the ambient-air inlet device.

According to the invention, the wing can comprise at least one leading edge slat, coupled to the main wing, which leading edge slat can, in particular, be movable relative to said main wing, and which leading edge slat comprises a leading-edge slat de-icing duct that is integrated in the main wing and extends along its wingspan direction, as well as comprising at least one coupling line which fluidically connects the leading-edge slat de-icing duct of at least one leading edge slat to the engine bleed-air duct of the main wing. The respective leading-edge slat de-icing duct can comprise several outlet apertures that discharge at the trailing edge of the leading edge slat. These outlet apertures can be provided in such a manner that separation of the flow around the wing is delayed by the air flowing out through the outlet apertures. In this arrangement the wing can comprise several leading edge slats, with several of them each comprising a leading-edge slat de-icing duct, wherein at least two leading edge slats arranged side-by-side in the wingspan direction are connected by means of a connecting line.

According to a further aspect of the invention, an aircraft with a wing is provided, wherein
- the aircraft comprises at least one sensor device for acquiring flight state data,
- the aircraft comprises a control device that is functionally coupled to the sensor device and to the device for influencing the flow, and comprises a function which based on the flight state data, generates control commands for the device for influencing the flow in the ambient-air duct and sends said commands to said device,
- the device for influencing the flow comprises a receiving module for receiving control signals from the control device, and comprises a function which sets the output of the device for influencing the flow.

The aircraft can, in particular, comprise a sensor device, which is functionally connected to the control device, for acquiring the outside temperature; a sensor device for acquiring the aircraft speed; and/or a sensor device for acquiring the flight altitude or the absolute pressure.

According to an exemplary embodiment of the invention, the device for influencing the flow comprises a flow assist drive that in order to increase the flow in the ambient-air duct extending from the ambient-air inlet device to the ambient-air outlet device is integrated in the ambient-air duct and comprises an interface for receiving control commands from the control device to influence the flow in the ambient-air duct in that based on control commands by means of the conveying output of the flow assist drive the speed of the flow is controlled. As an alternative or in addition, it can be provided for the device for influencing the flow to comprise an aperture-changing device with an aperture-changing mechanism with a cover for opening and closing the aperture, and an actuator for operating the aperture-changing mechanism, which actuator comprises an interface for receiving control commands from the control device in order to set the opening state of the cover on the basis of control commands for influencing the flow in the ambient-air duct.

In particular, the flight state data, on the basis of which the control function of the control device generates the control commands for the respective device for influencing the flow, can be based on a state variable or a combination of the following state variables: the outside temperature, the aircraft speed, the flight altitude and/or the absolute pressure. In this arrangement the atmospheric humidity can be used in addition.

In a further exemplary embodiment, in the main wing a temperature measuring device for measuring the temperature of the engine bleed-air is installed in at least one position in the engine bleed-air duct, and/or a temperature measuring device for acquiring the temperature at a surface region of the leading edge of the main wing is installed between the fuselage and the engine, which temperature measuring device is functionally connected to the control function for the purpose of transmitting the acquired temperature values. In this arrangement the control function can comprise a regulating function that generates control commands for transmission to the device for influencing the flow in the ambient-air duct, by means of which control commands a target temperature of the temperature of the engine bleed-air or of the leading edge of the main wing is regulated. In this embodiment it can, in particular, be provided for the regulating function to be activated when the aperture-changing device is fully open, and in this state a greater flow rate in the ambient-air duct is required, so that then, for example, the flow assist drive is activated and vice versa.

According to a further aspect of the invention, a wing section of an aircraft with an engine bleed-air duct arrangement for conveying hot engine bleed-air from an engine is provided. In this embodiment the engine bleed-air duct arrangement comprises:
- an engine bleed-air duct,
- an ambient-air duct that extends along the engine bleed-air duct and that rests against the engine bleed-air duct so that the ambient-air duct and the engine bleed-air duct form a heat exchanger,
- an exterior envelope with an envelope interior and an envelope exterior that when viewed in cross section of the duct arrangement encompasses the ambient-air duct at least in part,
- an attachment device for attaching the duct arrangement to the wing section.

In this exemplary embodiment it can be provided for
- the engine bleed-air duct to comprise segments which when viewed in longitudinal direction of the duct arrangement are arranged one behind the other,
- the ambient-air duct to comprise segments which when viewed in longitudinal direction of the duct arrangement are arranged one behind the other.

The duct-shaped profile section can be designed in such a manner that it circumferentially encompasses the exterior of the interior casing in a helical manner.

As an alternative or in addition to this, the profile section can comprise a partial hollow profile, wherein the circumferential section that when viewed in cross section is open is closed by the outside of the cylindrical casing of the engine bleed-air duct.

In this arrangement the profile section can be connected to the exterior of the interior casing so as to be pressure-tight. In this arrangement the profile section can be welded onto the exterior of the interior casing so as to be pressure-resistant.

Furthermore, it can be provided for the engine bleed-air duct arrangement to comprise several segments, wherein on at least one of the two sides of the bleed-air duct segment a connection region for connecting a further bleed-air duct segment is formed.

According to a further aspect of the invention, a bleed-air duct segment for forming a bleed-air duct arrangement with integrated heat exchanger for conveying hot bleed-air from an engine to a component of an aircraft is provided. The bleed-air duct segment comprises: an exterior envelope segment with an envelope interior and an envelope exterior, which envelope segment can be assembled with at least one further exterior envelope segment to form an exterior envelope with an envelope interior and an envelope exterior; an interior casing segment with an interior of the interior casing and an exterior of the interior casing, which interior casing segment can be assembled with at least one further interior casing segment to form an interior casing with an interior of an interior casing and an exterior of the interior casing; and an insulation material or an insulation material layer in the clearance formed between the envelope interior and the exterior of the interior casing, wherein at least one duct-shaped profile section for forming a duct extends along the exterior of the interior casing. The interior casing extends within the exterior envelope segment.

In the assembled state, installed in the aircraft, of the at least one bleed-air duct segment the interior casing segment is coupled to an air outlet of an engine so that bleed-air flows in the interior casing segment. Furthermore, in this arrangement the profile section, when it is installed in an aircraft structure, comprises an inlet or an access to the ambient air so that ambient air flows through the profile section. In this arrangement the bleed-air duct segment can be designed and installed in the aircraft in such a manner that air from the surroundings of the aircraft flows against the direction of flow of the bleed-air.

The bleed-air duct segment consequently comprises a double casing that is formed from the interior casing and the exterior envelope segment with a duct segment embedded in insulation material. In this arrangement the two casings, namely the exterior envelope or the exterior envelope segment, and the interior casing or the interior casing segment, preferably share a common centre axis when viewed in longitudinal direction of the bleed-air duct arrangement or of the bleed-air duct segment; in other words, at all points the exterior envelope is arranged so as to be equidistant from the interior casing. The hot engine air that flows in the duct of the bleed-air duct arrangement with the bleed-air duct segments releases at least some of its energy that heats up the interior casing. The cold ambient air that flows in the duct opposite to the direction of the bleed-air can absorb at least some of the energy that heats up the interior casing, and is heated up as a result of this. The efficiency of the heat transfer primarily depends on the material of the interior casing, which can be selected correspondingly, depending on the particular application.

The profile section of a bleed-air duct segment, which profile section forms a duct segment, can encompass the exterior of the interior casing of this bleed-air duct segment in a helical manner; in other words it can be helically placed or wound around the exterior of the interior casing. However, the profile section can also extend in parallel to, or along, a centre axis of the interior casing of the bleed-air duct segment on the exterior of the interior casing of the bleed-air duct segment. In this arrangement, for each bleed-air duct segment several such profile sections can be arranged side-by-side in circumferential direction, and can, for example, be fluidically interconnected at the beginning and/or the end of the bleed-air duct segment. In the construction of the bleed-air duct arrangement the profile sections of the bleed-air duct segments to be assembled together, which profile sections in order to form the duct are to be interconnected, are fluidically interconnected so as to be tight.

The profile section which in a bleed-air duct segment or in a bleed-air duct arrangement comprising bleed-air duct segments forms the duct for the ambient air can be designed as a pipeline segment or pipeline. In its region of support on the exterior of the interior casing said pipeline can be flat or can comprise a curvature of the radius of the exterior of the interior casing so that the latter rests flat against the exterior and in this way provides the largest possible support area. The basic shape of the pipeline segment or of the pipeline itself can be rectangular or semicircular, or it can have any commercially available shape or any shape specially produced for the particular purpose. If the duct segment is formed by the profile section in the shape of a hollow profile, this results in a first heat transfer between the bleed-air that flows through the duct and the interior of the interior casing; a second heat transfer between the exterior of the interior casing and the section of the exterior of the hollow profile, which section rests against the exterior of the interior casing; and a third heat transfer between the interior of the hollow profile in a region of the section of the hollow-profile segment, which region rests against the exterior of the interior casing, and the ambient air.

In order to improve the efficiency, the profile section can be formed by a partial hollow profile which when viewed in cross section of the hollow profile is not a closed profile shape, but is, for example, a pipe cut open in the middle in longitudinal direction. In this case the two ends of the partial hollow profile rest against the exterior of the interior casing, and the ambient air conveyed in the duct has direct contact to the exterior of the interior casing.

As a rule, a hollow profile, for example the above-mentioned pipe, by itself provides a pressure-tight profile section which then on the whole can be connected to the exterior of the interior casing. In order to form an airtight duct the partial hollow profile that forms the profile section can be affixed, so as to be pressure-tight, by its two partial-profile longitudinal edges, on the exterior of the interior casing, for example bonded or welded into place. In the case of a weld connection it can be made by means of a vacuum welding method, because by means of a vacuum welding method particularly good quality of the weld seam can be achieved, which satisfies the requirements of the aviation industry.

The profile section comprises a height H, wherein the term height denotes the maximum dimension by which the profile section, or the hollow profile or partial hollow profile that forms the profile section, perpendicularly protrudes from the exterior of the interior casing. In the case of, for example, a semicircular partial hollow profile, the height H continuously increases from the weld connection line and reaches its maximum at the zenith of the semicircle of the partial hollow profile. Since the profile section is arranged in the space between the exterior of the interior casing and the envelope interior, the maximum-possible height H corresponds to the space between these two areas.

However, the maximum height of the profile section can also be selected so that it measures less than the space between the exterior of the interior casing and the envelope interior. This results in a space between the surface of the profile section and the envelope interior, which space can be filled with insulation material as can the remaining space between the interior wall and the envelope. This insulation layer prevents the occurrence of any secondary heat exchange between the profile section and the envelope, which could have a negative effect on the efficiency of the primary heat exchange between the bleed-air and the ambient air.

In one exemplary embodiment several bleed-air duct segments are arranged in their longitudinal direction one behind the other and are interconnected so that the interior casing segments form an interior casing and the duct segments form a duct section or a duct. In order to, in this arrangement, be able to connect a bleed-air duct segment with at least one further bleed-air duct segment, at least on one of the two ends of the bleed-air duct segment a connection region is formed. The connection region is designed in such a manner that in a pressure-tight connection between two bleed-air duct segments at the same time a pressure-tight connection between the two profile sections that are present on the bleed-air duct segments is formed. In this arrangement in order to ensure a reliable pressure-tight connection it is possible to use additional sealants at the connection between the two profile sections and/or between the bleed-air duct segments. The connection region can thus comprise not only a first connection means on at least one axial end of the interior casing segment for connection to a further interior casing segment of a further bleed-air duct segment to be connected to the bleed-air duct segment, but also a second connection means on one end of the profile section for connection to a further profile section of a further bleed-air duct segment that is to be connected to the bleed-air duct segment.

The invention further relates to a bleed-air duct or a bleed-air duct arrangement with at least two bleed-air duct segments as described above which in their connection regions are interconnected so as to be pressure-tight. In most instances the bleed-air duct arrangement comprises several interconnected bleed-air duct segments, wherein a first bleed-air duct segment, which is situated on a first end of the bleed-air duct arrangement, by its profile section that forms the duct segment is provided for connection to an ambient-air inlet; and a last bleed-air duct segment, which is situated on a second end of the bleed-air duct arrangement, by its duct that forms the profile section is provided for connection to an engine supply line. This means that ambient air is conveyed by way of the ambient-air inlet into the duct; in the duct is conveyed along the bleed-air duct; and on the end of the last bleed-air duct segment flows into an engine supply line, through which it is conveyed to the interior region of the engine. This additional air, which in this manner is conveyed to the engine or to the combustion process, counteracts the loss of output of the engine as a result of the branching-off of bleed-air.

In order to improve the quantity of air flowing in at the ambient-air inlet, in the region of the ambient-air inlet a blower can be arranged, which is, for example, electrically driven.

The bleed-air duct can, for example, be installed or integrated in a leading edge slat. In this arrangement the bleed-air duct can extend in longitudinal direction of the leading edge slat so that the cooled bleed-air in the bleed-air duct can, for example, be used to heat the edge of the leading edge slat in order to, for example, prevent icing in this region, or in order to protect hydraulic lines against excessive cooling, which could have a negative effect of the flow characteristics of a hydraulic fluid.

The invention further relates to a bleed-air duct system with a bleed-air duct as described above, and with an additional regulating device by means of which the quantity of bleed-air flowing into the bleed-air duct can be regulated. In this arrangement the regulating device can comprise a function by means of which the quantity of inflowing bleed-air can be regulated depending on the air temperature aimed at in the bleed-air duct. This means that the regulating device can increase the quantity of inflowing bleed-air when the temperature of the bleed-air in the bleed-air duct is lower than aimed at; and can reduce the quantity of inflowing bleed-air when the temperature of the bleed-air in the bleed-air duct is too high. In the function of the regulating device a target value for the temperature of the bleed-air in the bleed-air duct can be specified as a comparison value, according to which the regulating device regulates the inflowing bleed-air quantity. The regulating device can also be functionally coupled to at least one further aircraft system function, which transmits a temperature value to the regulating device, for example the ambient temperature of the aircraft or the temperature of the fluid in a hydraulic subsystem, according to which temperature value the regulating device regulates the quantity of the inflowing bleed-air. In this arrangement, in particular, the ambient-air inlet can comprise a blower for increasing the quantity of ambient air that flows in.

BRIEF DESCRIPTION OF THE DRAWINGS

Below, exemplary embodiments of the invention are described with reference to the enclosed figures which show the following:

FIG. 6b illustrates a second exemplary embodiment of a wing-engine combination according to the invention in the illustration according to FIG. 6a.

DETAILED DESCRIPTION OF THE INVENTION

Figure 1:
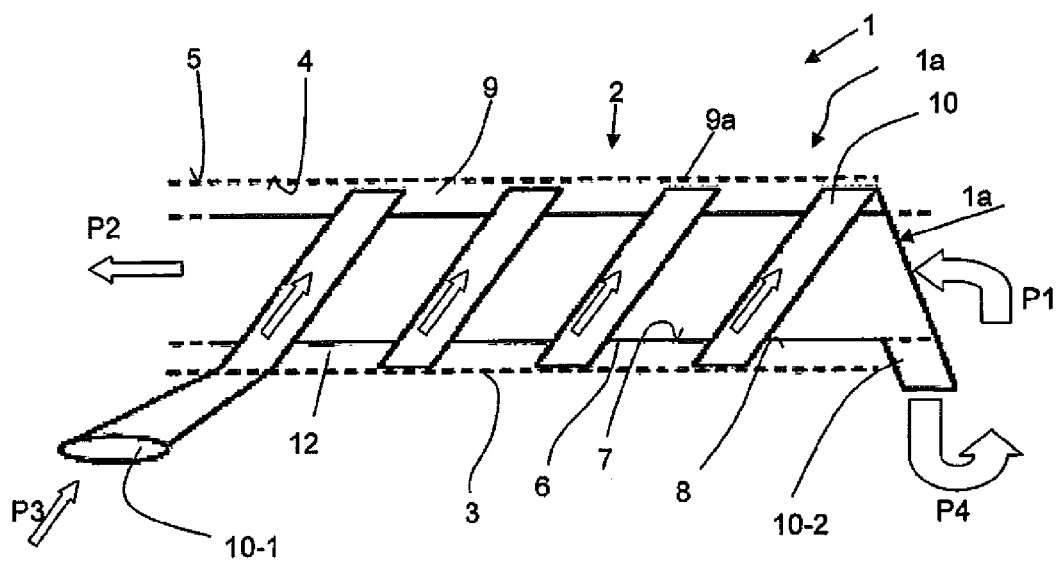
FIG. 1 illustrates a diagrammatic section view of an exemplary embodiment of the engine bleed-air duct arrangement provided according to the invention, with an engine bleed-air duct and an ambient-air duct situated within an envelope exterior shown in a dashed line.

FIG. 1 shows a diagrammatic section view of an embodiment of the bleed-air duct arrangement or engine bleed-air duct arrangement 1 according to the invention, which comprises a main duct or an engine bleed-air duct 1 for conveying hot air that has been removed from the engine, or bleed-air, and an ambient-air duct 10 for conveying ambient air. According to the invention, the engine bleed-air duct arrangement 1 is provided for structural integration in an aircraft AC and in particular in a wing W of an aircraft AC.

According to the invention, the use of engine bleed-air is generally provided for various functional purposes in the aircraft AC. In this arrangement the engine bleed-air can be used for de-icing structural components of the aircraft, and in particular the wing W as well as devices and systems in the aircraft AC. By providing the engine bleed-air duct arrangement 1 according to the invention, the engine bleed-air can be used for the above-mentioned purposes, and in this process the supply or conveying of engine bleed-air in the wing W can be matched to the requirements of the wing structure, and in particular to the characteristics of modern materials. By providing an ambient-air duct, which at least in some sections extends along, and outside, the engine bleed-air duct, according to the invention the bleed-air conveyed in the engine bleed-air duct is optimally cooled by the ambient air which is cooler when compared to said bleed-air.

In this arrangement the entire engine bleed-air duct arrangement 1 or the wing-engine combination according to the invention with the engine bleed-air duct arrangement 1 can be designed in such a manner that the heat of the bleed air matches the particular application.

In an exemplary embodiment of the invention, a consumer to which according to the invention the bleed-air is supplied is an air conditioning system of the aircraft AC.

According to an exemplary embodiment of the invention, the ambient air can be taken up into the ambient-air duct 10 and can be conveyed in the latter without said ambient air being changed in an active manner. According to a further aspect, a device for influencing the flow can be integrated in the ambient-air duct 10 in order to actively influence the flow in the ambient-air duct 10.

Figure 6A:
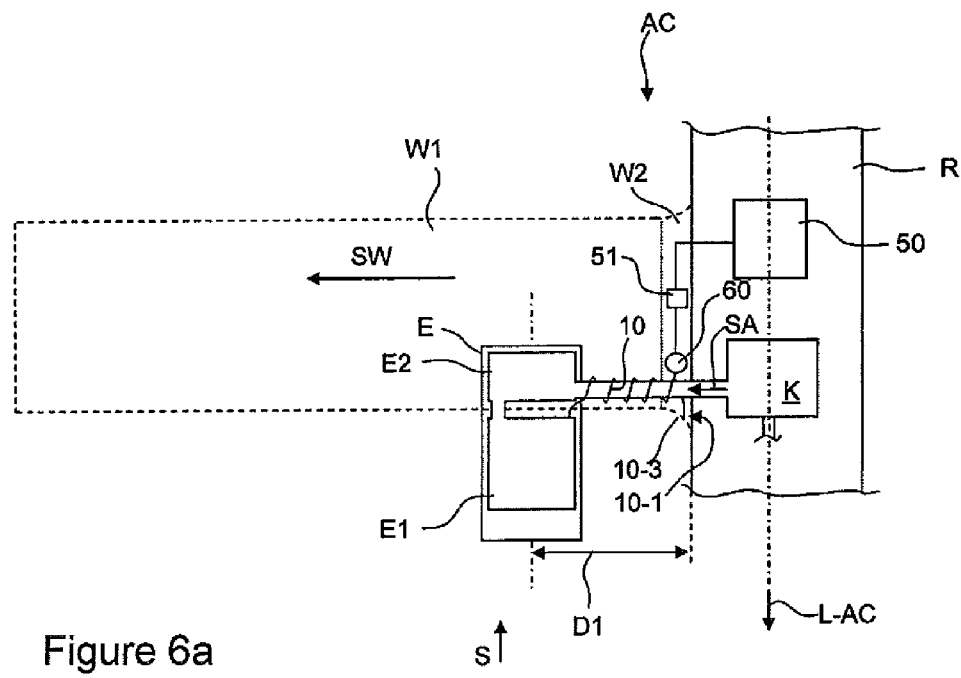
FIG. 6a illustrates an exemplary embodiment of a wing-engine combination according to the invention in an illustration in which the arrangement of components of the aforesaid and of function modules are shown in a diagrammatic top view.
Figure 6B:
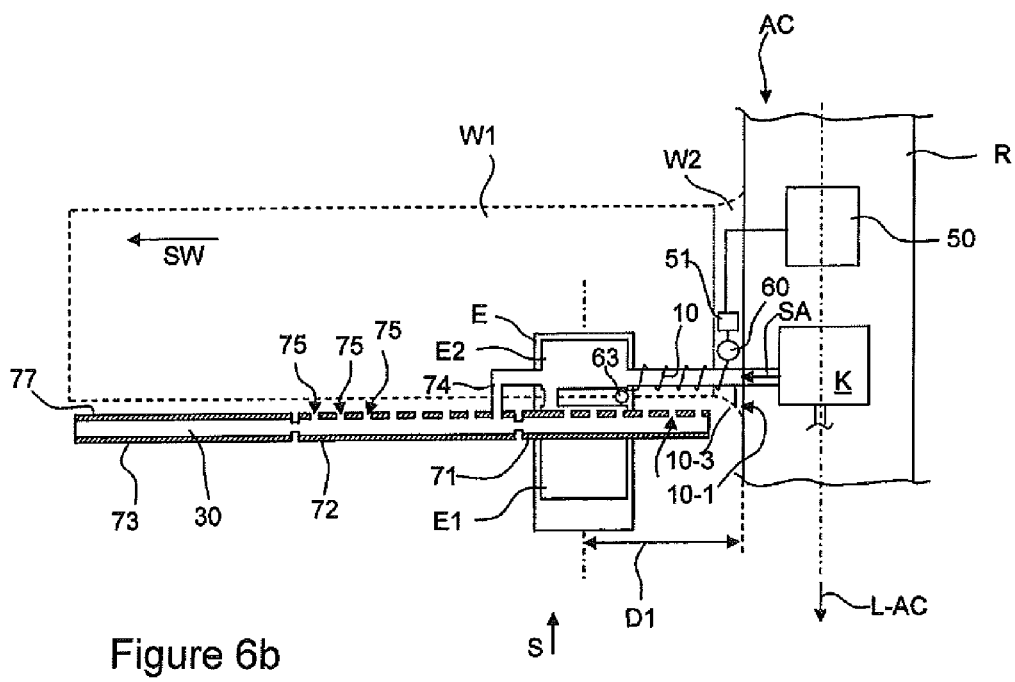

The wing-engine combination according to the invention according to FIGS. 6a and 6b comprises: a wing W with a main wing W1 and an engine E comprising a premixing chamber E1, a combustion chamber and a hot-air space E2. The premixing chamber is a space or a region of the engine in which space or region by mixing air with fuel the gas mixture is generated that is supplied for the combustion process. In the context of the invention the premixing chamber can also be a space associated with the premixing chamber or connected to said premixing chamber, with the gas from said space being supplied for the combustion process of the engine. The term "hot-air space" E2 of the engine E in this context refers to a space or a region of the engine, which space or region comprises air that has been heated directly or indirectly by the combustion process. The hot-air space E2 can, in particular, be the engine bypass flow chamber or the engine bypass flow space.

The wing W is connected to a fuselage R so that between the wing W and the fuselage R a connection region W2 is provided which can form part of the wing W or part of the fuselage R. Furthermore, the wing W can comprise a leading edge slat or several leading edge slats which is/are adjustable or non-adjustable relative to the wing W. In the FIGS. 6a and 6b in each case three leading edge slats 71, 72, 73 are shown on the shown wing W.

The wing-engine combination according to the invention comprises an engine bleed-air duct 2 that extends along the wingspan direction SW and at least in sections along the leading edge of the main wing. This comprises an engine bleed-air inlet device 2-1, that is coupled to an engine hot-air space E2 or an engine bypass flow chamber, and an engine bleed-air outlet device 2-2 that comprises a discharge orifice on the main wing W1 or a connecting part for coupling the engine bleed-air duct to a consumer of the engine bleed-air.

In this arrangement an ambient-air duct 10 extends along the longitudinal direction of the engine bleed-air duct 2. Said ambient-air duct 10 can extend closely or at a small space of e.g. up to 10 mm distance beside the engine bleed-air duct 2, and can, in particular, extend so as to rest against said engine bleed-air duct 2. The ambient-air duct 10 can, in particular, circumferentially encompass the engine bleed-air duct 2 in a helical manner. As an alternative the ambient-air duct 10 can be designed in such a manner that it encloses the engine bleed-air duct 2 fully in some sections or at least over a partial circumference.

The ambient-air duct 10 comprises an ambient-air inlet device 10-1 that is arranged on a component of the aircraft AC, which component faces the intended direction of flow-around S of the aircraft AC, or in the direction of the longitudinal axis of the aircraft L-AC, and comprises an aperture 10-3 for letting ambient air into the ambient-air duct 10. In this arrangement the aperture 10-3 can, in particular, be an aperture located in the surface contour of the wing, a so-called scub aperture. Furthermore, the ambient-air duct 10 comprises an ambient-air outlet device 10-2 with a passage between the ambient-air duct 10 and the premixing chamber E1 of the engine E. In the wing-engine combination according to the invention, the arrangement 1 comprising the engine bleed-air duct 2 and the ambient-air duct 10 thus forms a heat exchanger device for cooling the air flowing in the engine bleed-air duct 2, and the ambient air conveyed in the ambient-air duct 10 is fed for combustion in the engine.

The wing-engine combination according to the invention can be integrated in the wing and can be designed in such a manner that in the flow around the wing W and the fuselage R, which flow occurs as intended during flight, the engine bleed-air in the engine bleed-air duct flows from the engine to the engine bleed-air outlet device, and the ambient air in the ambient-air duct 10 flows in a direction of flow that is opposite to the direction of flow of the engine bleed-air.

The component of the aircraft on which the aperture 10-3 of the ambient-air inlet device 10-1 is provided can generally-speaking be located on a surface of the wing, wherein the ambient-air inlet device 10-1 is, in particular, designed in such a manner that the aperture 10-3 or orifice of the ambient-air duct 10 comprises a directional component that is directed in the direction of the flow that flows around the wing as intended. In this arrangement the directional component is the surface normal of the cross-sectional area of the aperture 10-3. The component of the aircraft on which the aperture 10-3 of the ambient-air inlet device 10-1 is provided can, in particular, be the wing connection region W2 that extends from the fuselage exterior in the direction of the engine mount at a distance of 10% of the distance D1 between the fuselage exterior and the engine mount or of the belly fairing region or a surface of the belly fairing.

An exemplary embodiment of an engine bleed-air duct arrangement 1 designed according to the invention is shown in FIGS. 1 to 4 as well as 5a and 5b and comprises at least two segments 1a that are interconnected so as to be pressure-tight. As an alternative, the engine bleed-air duct arrangement 1 can also comprise a single segment of an engine bleed-air duct 2. In this arrangement said engine bleed-air duct 2 can be formed by a segment of an ambient-air duct 10 or by several segments 10a of an ambient-air duct 10. In the exemplary embodiment shown, the main duct 2 of the bleed-air duct arrangement 1 is provided for conveying hot air or warm air from a hot-air chamber and in particular from the bypass flow region of the engine of an aircraft. The inflow of hot air is diagrammatically indicated by means of the arrow P1, while the outflow of hot air is indicated by means of the arrow P2. The hot air is conveyed for further use to a consumer, which can, in particular, be an air conditioning system of the aircraft. For the purpose of removing the hot air from an engine chamber or from the hot-air region E2 of the engine E, the main duct 2 is connected to the engine chamber or the hot-air region E2 by way of a connecting piece in order to remove hot air. Further consumers may include, for example, the pressurised cabin in which the bleed-air is used for regulating the heat and for supplying pressure, or fuel tanks, hydraulic tanks or water tanks that are kept pressurised by means of the bleed-air.

The exemplary embodiment, shown in FIGS. 1 to 4 and 5a, 5b, of the engine bleed-air duct arrangement 1 according to the invention comprises an interior casing 6 to form an engine bleed-air duct 2 or a segment 2a of the aforesaid, as well as an ambient-air duct 10 or duct segment 10a of the ambient-air duct that extend along said engine bleed-air duct 2 and circumferentially encompass said engine bleed-air duct 2 in a helical manner. The engine bleed-air duct arrangement 1 further comprises an exterior envelope 3 that surrounds the engine bleed-air duct 2 and the ambient-air duct 10. The exterior envelope 3 can extend in the cross section so as to be either closed or open, i.e. over a partial circumference of the ambient-air duct 10. In the space between the exterior envelope 3 and the interior casing 6 the ambient-air duct 10 or the duct segments 10a of the ambient-air duct 10a is/are arranged or affixed. In an exemplary embodiment several profile sections 10a are arranged one behind the other and are connected to form an ambient-air duct 10. In the exemplary embodiment shown the individual profile sections or duct segments 10a of the ambient-air duct 10 are attached to the exterior 8 of the interior casing of the respective engine bleed-air duct segment 2a. As a result of the provision of the exterior envelope 3, effective cooling of the engine bleed-air in the engine bleed-air duct 2 takes place.

The exterior envelope 3, too, can comprise envelope segments 3a, arranged one behind the other in longitudinal direction L-S of the engine bleed-air duct arrangement.

The ambient-air duct 10 comprises an inlet or an ambient-air inlet device 10-1 through which air from the surroundings of the aircraft flows into the duct (arrow P3). In this arrangement the ambient-air inlet device 10-1 for the ambient-air can be situated near the consumer-end of the bleed-air duct 1. In this way the engine bleed-air, in particular in the region of the engine bleed-air duct arrangement that is situated relatively near the respective consumer, can be cooled particularly effectively. The ambient-air inlet device 10-1 can therefore, in particular, be connected to the interior of a pressurised cabin, of a fuel tank, hydraulic tank or water tank by way of a connecting piece or a coupling. The ambient air flows into the ambient-air duct 10 against the direction of flow of the bleed-air in the direction of the engine end of the duct 10. On the engine end of the ambient-air duct 10 the ambient air can be fed to the engine E for further use, in particular by way of an ambient-air outlet device 10-2. This ambient-air outlet device 10-2 is thus, in particular, a supply device to an engine chamber, for which purpose, in particular, a premixing chamber E1 is provided.

The engine bleed-air duct arrangement 1 can be arranged within the wing or with the wing W in such a manner that in said wing the engine bleed-air flows from the engine bleed-air inlet device to the engine bleed-air outlet device, and the ambient-air duct 10 can in this arrangement furthermore be designed in such a manner that the ambient air flows from the ambient-air inlet device to the ambient-air outlet device.

In this case the ambient air on its way from the ambient-air inlet device 10-1 to the ambient-air outlet device 10-2 is heated up by the engine bleed-air that flows in the opposite direction, and the engine bleed-air is cooled accordingly. The engine bleed-air duct 2 or the engine bleed-air duct segment 2a and the ambient-air duct 10 form a heat exchanger in that the heat of the engine bleed-air is partly transferred to the ambient air that flows in the ambient-air duct 10. The efficiency of this heat exchange can be improved, in particular, by: the selection of a suitable material for the interior casing 6 or its thermal conductivity; the material of the ambient-air duct 10 or its thermal conductivity, in particular if the ambient-air duct 10 rests against the exterior 8 of the interior casing; the selection of the size of the entire common heat transfer surface of the ambient-air duct 10 and the exterior 8 of the interior casing; the selection of the quantity of the engine bleed-air flowing in the engine bleed-air duct 2; the quantity of the ambient air flowing in the ambient-air duct 10; and the selection of the temperature difference between the bleed-air and the ambient air.

In the embodiment shown in FIGS. 1 to 4 and 5a, 5b the ambient-air duct 10 can comprise coupled profile sections 10a or duct segments that are installed on an engine bleed-air duct segment 2a before the engine bleed-air duct segments 2a are assembled, or which are assembled so as to be separate of the aforesaid and in this process are attached, segment by segment, to the exterior 8 of the interior casing. The ambient-air duct 10 or its duct segments 10a can be designed as hollow profiles so that the heat exchange between the engine bleed-air and the ambient air takes place by way of the interior 7 of the interior casing of the engine bleed-air duct 2 and the exterior 8 of the interior casing of the engine bleed-air duct 2. Furthermore, the exterior 8 of the interior casing transfers the heat to the wall of the ambient-air duct 10 so that the air that flows in the ambient-air duct 10 is heated. In contrast to this, if the ambient-air duct 10 is designed as a partial hollow profile in which its cross section is not closed, as is the case e.g. in a half pipe, then the ambient-air duct 10 can be formed in that the open longitudinal region of the half pipe rests against the exterior 8 of the interior casing 6 so that its two longitudinal-section edges rest against the exterior 8 of the interior casing so as to be pressure-tight, and/or in that said half pipe is connected, by means of an adhesive connection or a weld connection, to the exterior 8 of the interior casing so as to be pressure-tight. At the position of heat transfer the ambient-air duct 10 does not have a wall of its own, and consequently the heat exchange between the engine bleed-air and the ambient air takes place only by way of the interior 7 of the interior casing and the exterior 8 of the interior casing. This results in particularly effective heat transfer, which is favourable in some applications, between the engine bleed-air and the ambient air.

Such a partial hollow profile of the ambient-air duct 10 can comprise various shapes. Instead of the half pipe described above it can, for example, comprise the shape of a U-profile, a V-profile or some other cross-sectional shape that is suitable to form a duct. In this arrangement the width of the partial hollow profile, in other words the space between the two edges resting against the exterior 8 of the interior casing, can be selected at will. The heights, in other words the maximum space of the partial-pipe profile, measured from the exterior 8 of the interior casing in a direction perpendicular to the exterior 8 of the interior casing, can, however, at most correspond to the space between the exterior 8 of the internal wall and the envelope interior 4. In order to keep heat loss on the exterior envelope 3 of the bleed-air duct segment 2 as low as possible, the height of the partial hollow profile can be less than the space between the exterior 8 of the interior casing and the envelope interior 4 at this position, so that the exterior of the ambient-air duct 10 does not rest against the inside 4 of the exterior envelope 3.

The space 9 between the exterior envelope 3 and the interior casing 6 can be filled with insulation material 9b in order to form an optimal insulation layer. In this arrangement the ambient-air duct 10 that extends along the exterior 8 of the interior casing is encompassed by the insulation material 9b. In those cases where the height of the duct, as described above, is less than the space between the exterior 8 of the interior casing and the envelope interior 4, the ambient-air duct 10 is encompassed by insulation material 9b in the entire region that does not rest against the engine bleed-air duct 2.

Figure 2:
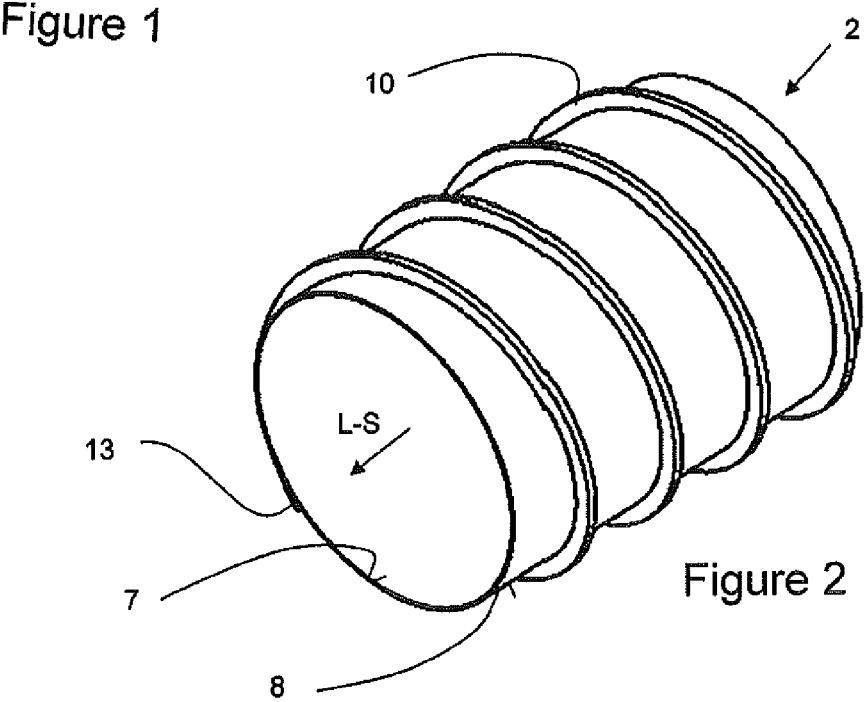
FIG. 2 illustrates a perspective view of an exemplary embodiment of the engine bleed-air duct arrangement (with the envelope exterior not shown)

FIG. 2 shows a perspective view of an engine bleed-air duct arrangement 1 without an exterior envelope 3. The illustration shows the interior casing 6 with the exterior 8 of the interior casing, to which a partial hollow profile has been applied that forms a profile section or duct section 10a or a duct segment of the ambient-air duct 10. The duct segment 10a circumferentially encompasses in a helical manner the exterior 8 of the interior casing and extends along the longitudinal direction L-S of the entire bleed-air duct segment 2a. In this arrangement the duct segment 10a at its front end (shown) and at its rear end (not visible in FIG. 2) comprises a connecting region each, to which in each case an outlet 15 of a duct segment 10a can be connected to the respective end of a duct segment 10a with the inlet 14 of a further duct segment 10a of the engine bleed-air duct arrangement 1.

Figure 3:
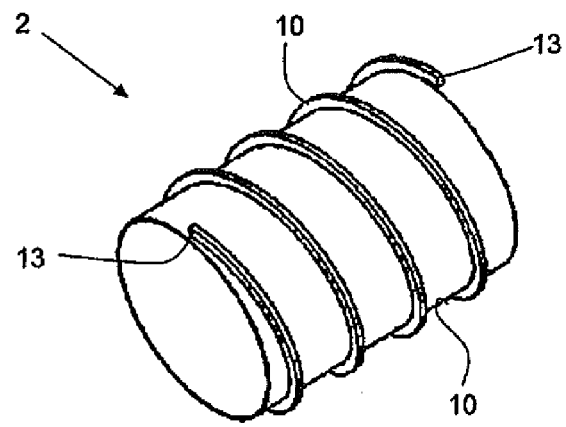
FIG. 3 illustrates a further perspective view of an exemplary embodiment of the engine bleed-air duct arrangement (with the envelope exterior not shown)

FIG. 3 shows a further perspective view of the engine bleed-air duct arrangement 1 of FIG. 2.

Figure 4:
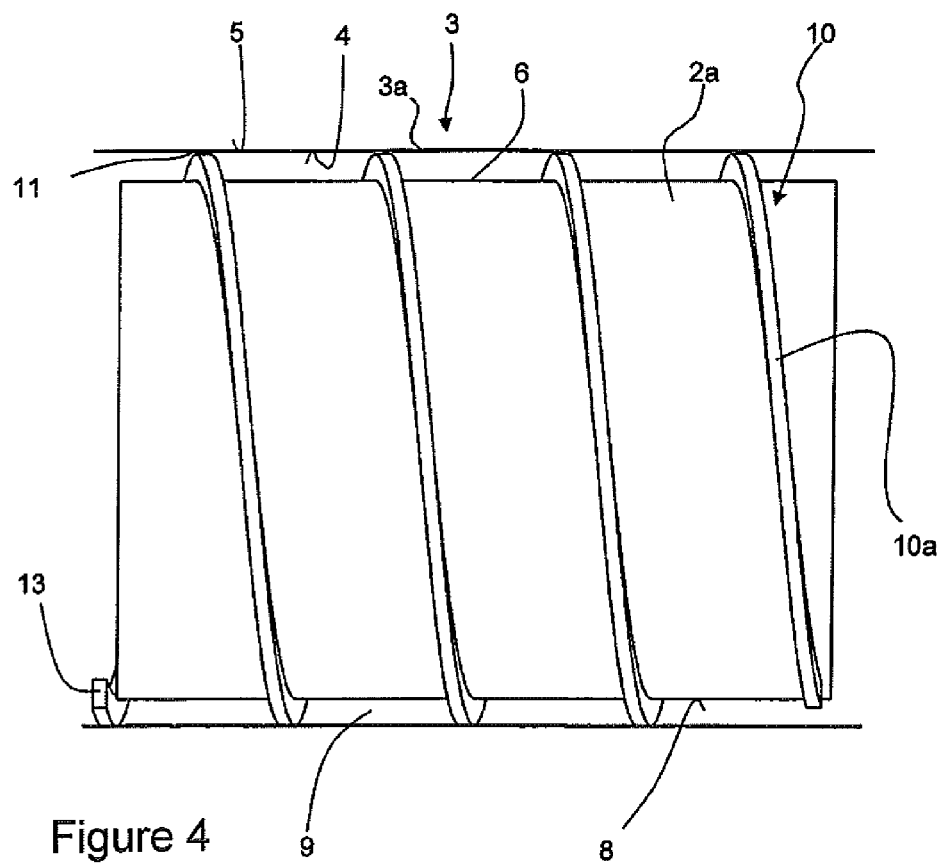
FIG. 4 illustrates a lateral view of an exemplary embodiment of the engine bleed-air duct arrangement (with the envelope exterior not shown)

FIG. 4 shows a lateral view of the engine bleed-air duct arrangement 1, in which the exterior envelope 3 is indicated, wherein the exterior envelope 3 in FIG. 4 is cut open so that in top view the duct segment 10a and its exterior 8 of the interior casing are visible. The illustration in FIG. 4 shows that the duct section 10a does not quite extend all the way to the envelope interior 4 of the exterior envelope 3 that forms part of the respective segment of an engine bleed-air duct arrangement, but instead that there is a gap 9a between the top of the duct and the envelope interior 4. The space between the interior casing 6 and the exterior envelope 3 can be filled with insulation material 9b; in other words, the duct section 10a is embedded in insulation material 9b on three sides.

Figure 5A:
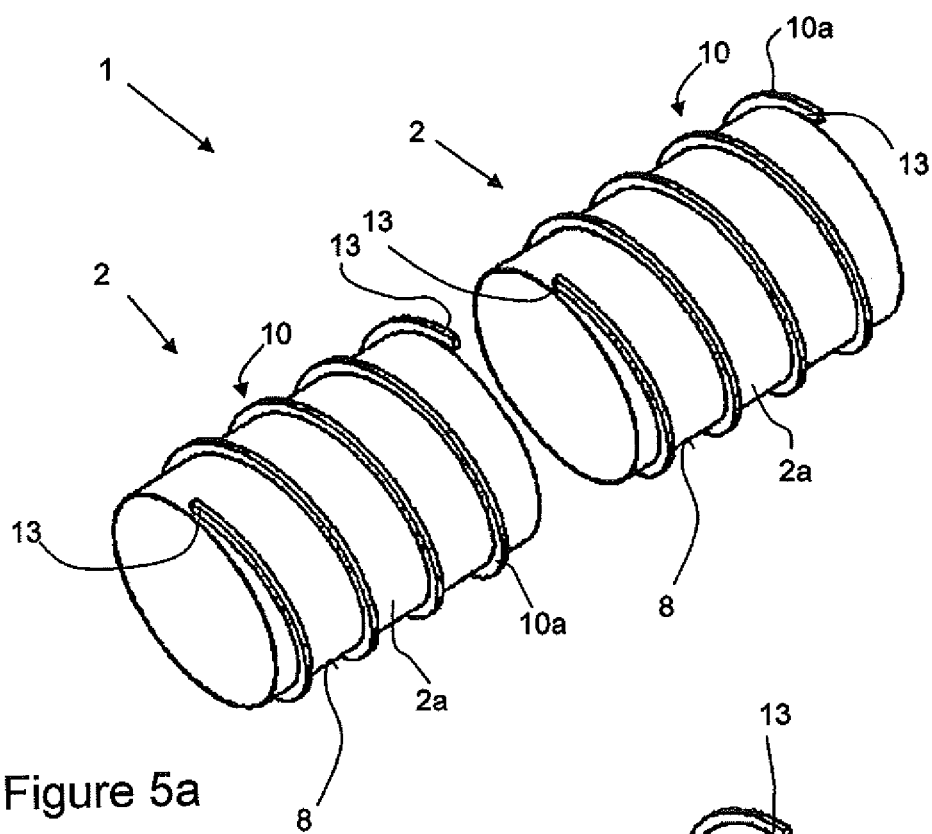
FIG. 5a illustrates a perspective view of two segments of an inventive engine bleed-air duct arrangement according to the invention, which segments in the diagram are shown when separate from each other.
Figure 5B:
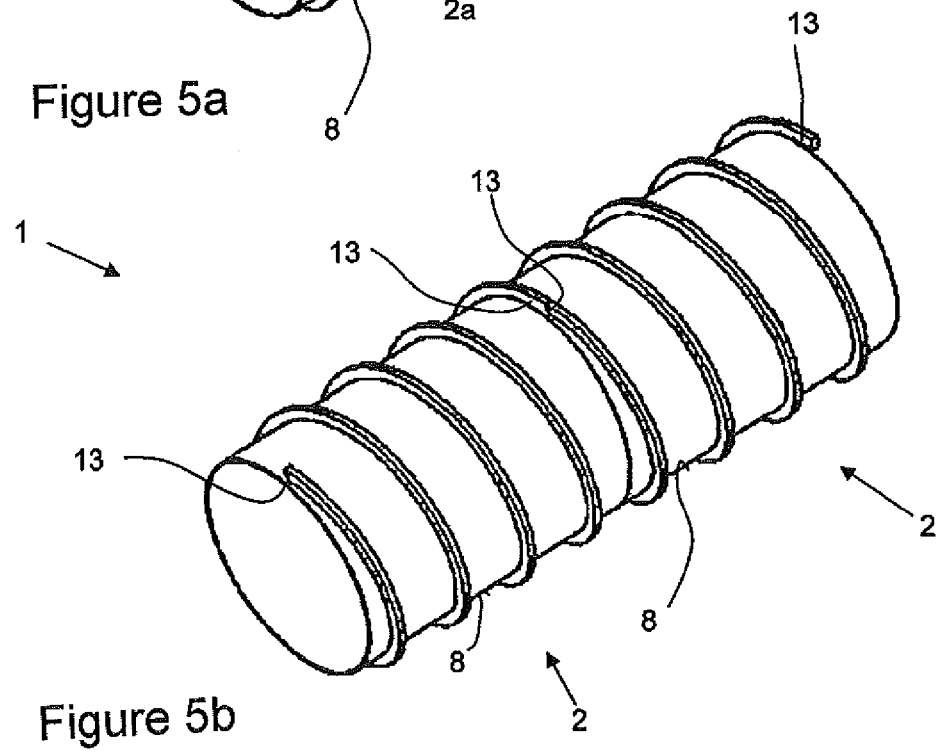
FIG. 5b illustrates a perspective view of the segments shown in FIG. 5a, of an engine bleed-air duct arrangement in the installed and interconnected state.

FIGS. 5a and 5b show that the illustrated exemplary embodiment of an engine bleed-air duct arrangement 1 is designed in such a manner that for installation of the engine bleed-air duct arrangement 1 two segments 1a can be interconnected in a connecting region. In a corresponding design of the connecting regions the connection regions 13 of the respective duct segments 10a of the ambient-air duct 10 as well as of the respective engine bleed-air duct segments 2a in each case can provide a pressure-tight connection, for example in that in each case two engine bleed-air duct segments 2a that are to be interconnected, and/or in each case two duct segments 10a that are to be interconnected, in the installed state engage each other by one length. In this arrangement producing the connection of an engine bleed-air duct arrangement 1 comprising two segments 1a can be achieved by placing the respective ends of the engine bleed-air duct segments 2a with a suitable rotary angle of the aforesaid relative to each other, and subsequent rotation of one of the engine bleed-air duct segments 2a relative to the respective other engine bleed-air duct segment 2a. Such "screwing on" can at the same time result in the two connection ends of the respective engine bleed-air duct segments 2a to be pushed against each other in a first step, so that the required pressure-tight connection can be achieved particularly well. In the region of the connection of the duct segments 10a and/or of the engine bleed-air duct segments 2a, in addition sealants or sealing devices (not shown) can be used between the ends of the respective segments 2a or 10a in order to prevent bleed-air and/or ambient air from issuing from the connecting locations of the engine bleed-air duct arrangements 1 or the profile sections or duct segments of the ambient-air duct 10a.

Figure 5C:
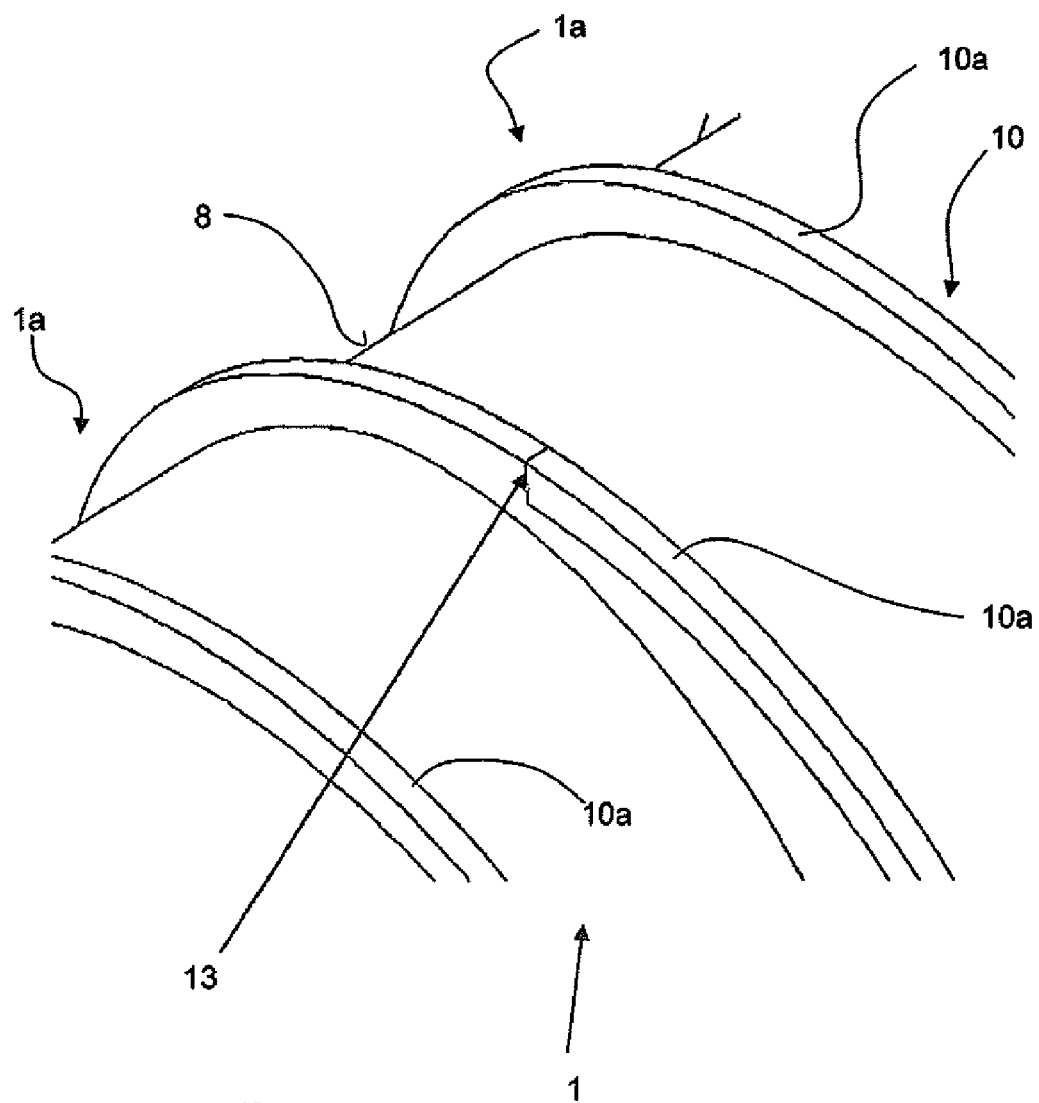
FIG. 5c illustrates an enlarged section of the engine bleed-air duct arrangement with two interconnected segments.

FIG. 5c shows the connecting region 13 of two duct sections 10a formed on the exterior 8 of the interior casing of two adjacent engine bleed-air duct arrangements 1 at the time of connection.

According to a further aspect of the invention, the quantity and/or the speed of the ambient air that flows into and/or in the ambient-air duct 10 is actively influenced by means of one or several devices for influencing the flow in the ambient-air duct 10. The ambient-air inlet device 10-1 could comprise an aperture-changing device or a valve with a cover or a cover cap which depending on the requirement for ambient air in the ambient-air duct 10 is controlled and opened or closed by a control device. As an alternative it is also possible in the ambient-air duct 10 and in particular in the inlet region or on the ambient-air inlet device 10-1 to provide a flow assist drive that is controlled by a control device, and, for example, to provide a pump or a fan which can be activated, deactivated and/or controlled to set its output as required in order to influence, i.e. to increase or decrease, the quantity of ambient air flowing into the ambient-air duct 10. It is also possible to provide both an aperture-changing device and a flow assist drive, with both of them being controlled by the control device.

To this effect the aircraft AC comprises one sensor device or several sensor devices (not shown) for acquiring flight state data. The at least one sensor device is functionally connected to the control device and comprises a receive module for receiving acquired flight state data. The control device is functionally coupled to the respective device for influencing the flow and comprises a function which on the basis of the flight state data generates control commands for the device for influencing the flow in the ambient-air duct and sends this data to said device. The at least one device for influencing the flow in each case comprises a receive module for receiving control signals from the control device and a function that sets the output of the device for influencing the flow, in order to influence the flow in the ambient-air duct 10.

The sensor device can comprise a sensor for acquiring the outside temperature, a sensor for acquiring the aircraft speed, a sensor for acquiring the flight altitude, a sensor for acquiring the atmospheric humidity, and/or a sensor for acquiring the absolute pressure. These sensors can, in particular, be sensors that are available anyway in an aircraft system.

As an alternative or in addition, a sensor for acquiring the flow speed on the surface of the wing W or in the region of the ambient-air inlet device 10-1, and in particular of the aperture of the latter, can be provided. The sensor can be a piezo wall shear-stress sensor for acquiring the wall shear stress, from which sensor the flow speed at the position at which the sensor is arranged can be determined.

In this arrangement it can be provided for the sensor data required in each case by the control function to be received directly by the respective sensors, or for the sensor data at first to be transmitted from the respective sensors to a flight control system or mission system, and from there to be conveyed to the control function.

The control function can comprise an allocation function in which a value for a control command is allocated to sensor values of a sensor, so that with the identification of the respective control command said control command is generated and transmitted to the respective device for influencing the flow. Such an allocation function can be stored in the control device, in particular in a storage device, in tabular form or in matrix form, to which storage device the control function has access. As an alternative or in addition, the control function can also comprise an analytical function to determine the control commands.

According to a further exemplary embodiment, it can be provided for the function to use a combination of sensor values. In particular, the control function can use two or three sensor values of the group of sensor values of an acquired outside temperature, an acquired aircraft speed or an acquired flight altitude, and from these in each case determine the probability or make an assumption relating to the presence of an increased risk of icing on the wing. This can, in particular, take place by weighting sensor values according to their proximity to a respectively predetermined limit value, wherein an evaluation number is allocated to each sensor value, which evaluation number is proportional to its distance from the limit value. In this case the sum of the evaluation numbers is associated with a particular intensity by which the flow in the ambient-air duct 10 is to be increased or decreased so that from this sum the control command for the set value of the device for influencing the flow is determined. The setpoint value relating to a flow assist drive corresponds to the latter's output power to be commanded, and the setpoint value relating to an aperture-changing device corresponds to the latter's aperture position. Generally speaking it is also possible to use an absolute pressure instead of using the flight altitude.

In the design of a device for influencing the flow as an aperture-changing device (not shown in the figures) said device comprises an aperture-changing mechanism, a cover for opening and closing the aperture 10-3, and an actuator for operating the aperture-changing mechanism. The cover can, for example, be a slide that is guided by a guide device attached to a structural component and that covers the aperture 10-3 to a greater or lesser extent depending on its adjustment state. The actuator comprises an interface for receiving control commands from the control device in order to set the opening state of the cover on the basis of control commands for influencing the flow in the ambient-air duct.

The control device 51 can be functionally and/or physically integrated in the flight control device 50 or in the mission control device, or it can be functionally connected by the aforesaid by way of a databus or a signal connection.

According to a further exemplary embodiment, by setting the flow quantity and/or the speed of the flow in the ambient-air duct 10 by means of a regulating function a predetermined temperature of the engine bleed-air on at least one position in the engine bleed-air duct 2 and/or a predetermined temperature at a surface region of the leading edge of the main wing between the fuselage and the engine are/is regulated. In this arrangement it is also possible in each case for a temperature range to be predetermined or regulated. In this exemplary embodiment a temperature measuring device for measuring the temperature of the engine bleed-air in at least one position in the engine bleed-air duct 2 and/or a temperature measuring device for acquiring the temperature in at least one surface region of the leading edge of the main wing are/is installed in the wing, between the fuselage and the engine. The temperature measuring device is functionally connected to a control function for controlling the described device for influencing the flow, for example a flow assist drive and/or an aperture-changing device. As an alternative or in addition to a flow assist drive and/or an aperture-changing device, the device for influencing the flow can also comprise a valve 63 that can be controlled by the control function in order to regulate the flow rate and/or the speed of the flow in the ambient-air duct 10 by way of opening and closing said valve 63. In this arrangement control of the valve 63 can be provided in the same manner as described in the context of the flow assist drive. The control function comprises a regulating function that generates control commands for transmission to the device for influencing the flow in the ambient-air duct 10, by means of which a target temperature of the temperature of the engine bleed-air or of the leading edge of the main wing is regulated. The target temperature can, in particular, be determined depending on the outside temperature, an acquired aircraft speed or an acquired flight altitude.

In this arrangement it can, in particular, be provided for the regulating function to be activated when the aperture-changing device is at its maximum open position.

Furthermore, it can be provided for the control function to be controlled by the flight control device 50 in defined operating modes of the aircraft system. In particular, it can be provided for said control function in ground operation to activate a provided flow assist drive 60 and to keep it at a predetermined output power because as a result of the low speed of the ambient air only a small throughput of ambient air can flow in the ambient-air duct 10. In particular it can be provided for the entire output power of the flow assist drive to be evenly divided into a low, a middle, and a high output power setting.

As an alternative or in addition, the described regulation can also take place on the basis of the bleed-air-temperature at the time, which is acquired with the use of a corresponding sensor, and/or on the basis of the engine bleed-air pressure at the time, which is acquired with the use of a corresponding sensor at or near a consumer or end user of engine bleed-air. In this arrangement in relation to a mentioned target temperature it is provided for more bleed-air to be conveyed to the engine bleed-air duct 1 when the temperature or the pressure is too low, and for the bleed-air supply to the engine bleed-air duct 1 to be throttled when the temperature and/or the pressure are/is too high.

According to the invention, on the wing W at least one leading edge slat 71, 72, 73 can be arranged, which can, in particular, be movably coupled relative to said wing W. One or several of the leading edge slats comprise a leading-edge slat de-icing duct 30 of the leading edge slat, which leading-edge slat de-icing duct 30 is integrated in the aforesaid and extends along its wingspan direction SW, as well as comprising at least one coupling line 74, which fluidically connects the leading-edge slat de-icing duct 30 of at least one leading edge slat 71, 72, 73 to the engine bleed-air duct 2 of the main wing W1. When the respective leading edge slat is adjustably arranged on the main wing W1, said leading edge slat is designed so as to be adjustable in length and, for example, telescopically extendable. The outlet of the engine bleed-air from the respective leading edge slat can be implemented by means of existing suitable leakage losses or by a lateral outlet. The respective leading edge slat or leading-edge slat de-icing duct 30 can also comprise several outlet apertures 75 which discharge at the trailing edge 77 of the respective leading edge slat. The outlet apertures 75 can be provided such that they influence the flow around the main wing.

LIST OF REFERENCE CHARACTERS

1 Engine bleed-air duct arrangement
1a Segment of an engine bleed-air duct arrangement
2 Engine bleed-air duct or bleed-air duct
2a Engine bleed-air duct segment or main duct segment or bleed-air duct segment
2-1 Engine bleed-air inlet device
2-2 Engine bleed-air outlet device
3 Exterior envelope
3a Segment of the exterior envelope or exterior envelope segment
4 Envelope interior
5 Envelope exterior 6 Interior casing
6a Interior casing segment
7 Interior of the interior casing
8 Exterior of the interior casing
9 Clearance
9a Gap
10 Ambient-air duct
10a Profile section, duct segment of the ambient-air duct
10-1 Ambient-air inlet device
10-2 Ambient-air outlet device
10-3 Aperture of the ambient-air inlet device
13 Connection region
14 Inlet of a duct segment of the ambient-air duct
15 Outlet of a duct segment of the ambient-air duct
30 Leading-edge slat de-icing duct
50 Flight control device or mission control device
51 Control device
60 Flow assist drive
71 Leading edge slat
72 Leading edge slat
73 Leading edge slat
E Engine
E1 Engine-premixing chamber
E2 Engine hot-air region or engine bypass-flow space
L-AC Longitudinal direction of the aircraft
P1 Arrow indicating the inflow of hot air
P2 Arrow indicating the outflow of hot air
S Direction of flow
SW Wingspan direction
W Wing
W1 Main wing
W1 Connection region

The invention claimed is:

1. A wing-engine combination comprising:
a wing with a main wing and an engine with a premixing chamber, a combustion chamber and a hot-air space,
an engine bleed-air duct, which extends along a wingspan direction and along a leading edge of the main wing, the engine bleed-air duct comprising: an engine bleed-air inlet device that is coupled to an engine hot-air space, and an engine bleed-air outlet device including a discharge orifice on the main wing or a connecting part for coupling the engine bleed-air duct to a consumer of the engine bleed-air, and
an ambient-air duct, which extends along the engine bleed-air duct, the ambient-air duct comprising an ambient-air inlet device which is arranged on an aircraft component of the aircraft and comprises an aperture for letting ambient air into the ambient-air duct, and comprising an ambient-air outlet device with a passage between the ambient-air duct and a premixing chamber of the engine so that the arrangement comprising the engine bleed-air duct and the ambient-air duct forms a heat exchanger device for cooling air flowing in the engine bleed-air duct and so that the ambient air conveyed in the ambient-air duct is supplied for combustion in the engine.

2. The wing-engine combination according to claim 1, wherein the engine bleed-air duct and the ambient-air duct are designed in such a manner that with an intended flow around the wing the engine bleed-air in the engine bleed-air duct flows from the engine to the engine bleed-air outlet device, and the ambient air in the ambient-air duct flows in a direction opposite to a direction of flow of the engine bleed-air.

3. The wing-engine combination according to claim 1, wherein the component of the aircraft on which the aperture of the ambient-air inlet device is provided is arranged on a surface of the wing connection region that extends from the fuselage exterior in the direction of the engine mount spaced apart by 10% of a space between a fuselage exterior and an engine mount, or is arranged on a surface of a belly fairing.

4. The wing-engine combination according to claim 1, wherein the ambient-air duct circumferentially encompasses the engine bleed-air duct in a helical manner at least in some sections.

5. The wing-engine combination according to claim 1, wherein a device for influencing the flow in the ambient-air duct is integrated in the ambient-air duct.

6. The wing-engine combination according to claim 5, wherein the device for influencing the flow comprises a flow assist drive for influencing the flow that is integrated in the ambient-air duct that leads from the ambient-air inlet device to the ambient-air outlet device.

7. The wing-engine combination according to claim 5, wherein the device for influencing the flow comprises a moveable aperture-changing device with a cover for opening and closing the aperture of the ambient-air inlet device.

8. The wing-engine combination according to claim 1, wherein the wing comprises at least one leading edge slat, coupled to the main wing, which leading edge slat is movable relative to the main wing, and which leading edge slat comprises a leading-edge slat de-icing duct that is integrated in the main wing and extends along its wingspan direction, as well as comprising at least one coupling line which fluidically connects the leading-edge slat de-icing duct of at least one leading edge slat to the engine bleed-air duct of the main wing.

9. The wing-engine combination according to claim 8, wherein the leading-edge slat de-icing duct comprises several outlet apertures that discharge at the trailing edge of the leading edge slat.

10. An aircraft with a wing-engine combination comprising:
a wing with a main wing and an engine with a premixing chamber, a combustion chamber and a hot-air space,
an engine bleed-air duct, which extends along a wingspan direction and along a leading edge of the main wing, the engine bleed-air duct comprising: an engine bleed-air inlet device that is coupled to an engine hot-air space, and an engine bleed-air outlet device comprising a discharge orifice on the main wing or a connecting part for coupling the engine bleed-air duct to a consumer of the engine bleed-air, and
an ambient-air duct, which extends along the engine bleed-air duct, the ambient-air duct comprising an ambient-air inlet device which is arranged on an aircraft component of the aircraft and comprises an aperture for letting ambient air into the ambient-air duct, and comprising an ambient-air outlet device with a passage between the ambient-air duct and a premixing chamber of the engine so that the arrangement comprising the engine bleed-air duct and the ambient-air duct forms a heat exchanger device for cooling the air flowing in the engine bleed-air duct and so that the ambient air conveyed in the ambient-air duct is supplied for combustion in the engine, wherein:
a device for influencing the flow in the ambient-air duct is integrated in the ambient-air duct,
the aircraft comprises at least one sensor device for acquiring flight state data,
the aircraft comprises a control device that is functionally coupled to the sensor device and to the device for influencing the flow, and comprises a function which based on the flight-state data, generates control commands for the device for influencing the flow in the ambient-air duct and sends said commands to said device, and the device for influencing the flow comprises a receiving module for receiving control signals from the control device, and comprises a function which sets the output of the device for influencing the flow.

11. The wing-engine combination according to claim 10, wherein the engine bleed-air duct is coupled to an air conditioning system of the aircraft.

12. The aircraft according to claim 10, wherein at least one of: a sensor device, which is functionally connected to the control device, for acquiring the outside temperature; a sensor device for acquiring the aircraft speed; and a sensor device for acquiring the flight altitude or the absolute pressure are provided.

13. The aircraft according to claim 10, wherein the device for influencing the flow comprises a flow assist drive that in order to intensify the flow in the ambient-air duct extending from the ambient-air inlet device to the ambient-air outlet device is integrated in the ambient-air duct and comprises an interface for receiving control commands from the control device to influence the velocity of the flow in the ambient-air duct in that based on control commands by means of the conveying output of the flow assist drive the speed of the flow is controlled.

14. The aircraft according to claim 10, wherein the device for influencing the flow comprises an aperture-changing device with an aperture-changing mechanism, with a cover for opening and closing the aperture, and an actuator for operating the aperture-changing mechanism, which actuator comprises an interface for receiving control commands from the control device in order to set the opening state of the cover on the basis of control commands for influencing the flow in the ambient-air duct.

15. The aircraft according to claim 10, wherein the flight state data, on the basis of which the control function of the control device generates the control commands for the respective device for influencing the flow, is based on a state variable or a combination of at least one of the following state variables: the outside temperature, the aircraft speed, the flight altitude and the absolute pressure.

16. The aircraft according to claim 15, wherein the state variable or combination of state variables also includes atmospheric humidity.

17. The aircraft according to claim 10, wherein in the main wing at least one of: a temperature measuring device for measuring the temperature of the engine bleed-air is installed in at least one position in the engine bleed-air duct, and a temperature measuring device for acquiring the temperature at a surface region of the leading edge of the main wing is installed between the fuselage and the engine, which temperature measuring device is functionally connected to the control function for the purpose of transmitting the acquired temperature values, and in that the control function comprises a regulating function that generates control commands for transmission to the device for influencing the flow in the ambient-air duct, by means of which control commands a target temperature of the temperature of the engine bleed-air or of the leading edge of the main wing is regulated.

18. The aircraft according to claim 17, wherein the regulating function is activated when the aperture-changing device is at its maximum open position.

\* \* \* \* \*